US007437809B2

(12) United States Patent
Yamamoto et al.

(10) Patent No.: US 7,437,809 B2
(45) Date of Patent: Oct. 21, 2008

(54) EYEGLASS LENS PROCESSING APPARATUS

(75) Inventors: Takayasu Yamamoto, Toyohashi (JP); Hirokatsu Obayashi, Hoi-gun (JP); Yoshiaki Kamiya, Nagoya (JP)

(73) Assignee: Nidek Co., Ltd., Aichi (JP)

(*) Notice: Subject to any disclaimer, the term of this patent is extended or adjusted under 35 U.S.C. 154(b) by 0 days.

(21) Appl. No.: 11/316,839

(22) Filed: Dec. 27, 2005

(65) Prior Publication Data

US 2006/0140731 A1 Jun. 29, 2006

(30) Foreign Application Priority Data

Dec. 28, 2004 (JP) .......................... P2004-381566

(51) Int. Cl.
*B23B 37/00* (2006.01)
*B23B 27/00* (2006.01)
*B23Q 1/01* (2006.01)
*B23D 7/00* (2006.01)
*B24B 9/14* (2006.01)

(52) U.S. Cl. ........................ 29/26 A; 29/27 C; 29/560; 409/202; 409/235; 451/5; 451/255; 451/265

(58) Field of Classification Search ................. 29/26 A, 29/27 C, 558, 560, 527.3, 702; 409/235, 409/165, 80, 84, 201, 202; 408/124, 97; 451/5, 8, 11, 41, 42, 44, 255, 265
See application file for complete search history.

(56) References Cited

U.S. PATENT DOCUMENTS 4,989,316 A * 2/1991 Logan et al. .................. 29/558
5,716,256 A 2/1998 Mizuno et al.
6,481,095 B1 * 11/2002 Mizuno ....................... 451/42
6,561,738 B1 * 5/2003 Fujita et al. ................... 408/97
6,623,339 B1 * 9/2003 Igarashi et al. ................ 451/42
6,641,460 B2 * 11/2003 Obayashi ....................... 451/5
6,702,653 B2 * 3/2004 Shibata ........................ 451/42
6,785,585 B1 8/2004 Gottschald
6,790,124 B2 9/2004 Shibata
7,111,372 B2 * 9/2006 Feldman et al. ............. 29/26 A
2001/0053659 A1 * 12/2001 Shibata ........................ 451/42
2002/0072299 A1 * 6/2002 Obayashi ....................... 451/5
2003/0097741 A1 * 5/2003 Feldman et al. ............. 29/26 A
2004/0192170 A1 * 9/2004 Mizun ........................... 451/5
2005/0020186 A1 * 1/2005 Schneider et al. ............. 451/41

FOREIGN PATENT DOCUMENTS

| | | | |
|---|---|---|---|
| EP | 1 238 731 | A1 | 9/2002 |
| EP | 1 310 327 | A2 | 5/2003 |
| JP | 08-155945 | A | 6/1996 |
| JP | 2001-166269 | A | 6/2001 |
| JP | 2003-145328 | A | 5/2003 |
| JP | 2004-9201 | A | 1/2004 |
| WO | WO 00/67974 | A1 | 11/2000 |
| WO | WO 2005/025791 | A1 | 3/2005 |

* cited by examiner

*Primary Examiner*—Dana Ross
(74) *Attorney, Agent, or Firm*—Sughrue Mion, PLLC

(57) ABSTRACT

An eyeglass lens processing apparatus includes: a piercing unit that includes a piercing tool for piercing a hole in an eyeglass lens; a first input unit that inputs position data and depth data of a non-through hole to be formed in a refractive surface of the lens; a detecting unit that detects a position of a front end of the piercing tool; and a control unit that controls a process of forming the non-through hole based on the detected front-end position data, and the input position data and the input depth data.

9 Claims, 10 Drawing Sheets

EYEGLASS LENS PROCESSING APPARATUS

BACKGROUND OF THE INVENTION

The present invention relates to an eyeglass lens processing apparatus which performs a piercing process on an eyeglass lens in order to attach a rimless frame.

Generally, a piercing (drilling) process on an eyeglass lens, which is performed in order to attach a rimless frame such as so-called two-point frame, is manually performed by a drilling machine. However, recently, an eyeglass lens processing apparatus which can automatically perform the piercing process is suggested (see U.S. Pat. No. 6,790,124 (Japanese Unexamined Patent Application Publication No. 2003-145328))

The piercing process includes a step of forming a through hole, forming a spot-facing hole (non-through hole) and the like. In the processing apparatus, a drill and an end mill having a diameter of about 1 nm are used as a piercing (drilling) tool in consideration of the inner diameter of a hole formed in the eyeglass lens. However, the piercing tool is frangible. More particularly, when forming the spot-facing hole, the depth of the spot-facing hole formed by the piercing tool must be adjusted whenever the piercing tool is replaced with a new piercing tool. This is because the position of the front end of the piercing tool varies in an axial direction due to an individual difference in the length of the piercing tool itself and error generated when attaching the piercing tool to the processing apparatus. A method of adjusting the depth of the spot-facing hole is generally performed using a try and error method. However, this method is laborious and consumes much processing time.

SUMMARY OF THE INVENTION

An object of the present invention is to provide an eyeglass lens processing apparatus which can efficiently process an eyeglass lens, without manually adjusting the depth of a spot-facing hole.

In order to solve the aforesaid object, the invention is characterized by having the following arrangement.

(1) An eyeglass lens processing apparatus comprising:

a piercing unit that includes a piercing tool for piercing a hole in an eyeglass lens;

a first input unit that inputs position data and depth data of a non-through hole to be formed in a refractive surface of the lens;

a detecting unit that detects a position of a front end of the piercing tool; and a control unit that controls a process of forming the non-through hole based on the detected front-end position data, and the input position data and the input depth data.

(2) The eyeglass lens processing apparatus according to (1), further comprising:

a storing unit that stores the front-end position data of the piercing tool; and an operation unit that corrects the front-end position data stored in the storing unit in advance, based on the detected result of the detecting unit, wherein the control unit controls the process of forming the non-through hole based on the corrected front-end position data and the input position data and the input depth data.

(3) The eyeglass lens processing apparatus according to (1), further comprising a second input unit that inputs inclination angle data of the refractive surface at a hole position of the lens, wherein the control unit controls the process of forming the non-through hole based on the detected front-end position data, the input position data and the input depth data, and the input inclination angle data.

(4) The eyeglass lens processing apparatus according to (1), further comprising:

a lens holding unit that holds and rotates the lens; and a first movement tool unit that relatively moves the piercing tool with respect to the lens held by the lens holding unit, wherein the control unit controls rotation of the lens and the relative movement of the piercing tool.

(5) The eyeglass lens processing apparatus according to (1), wherein the detecting unit comprises:

a contactor;

a sensor that detects the movement of the contactor; and a second movement tool unit that relatively moves the piercing tool with respect to the contactor so that the contactor and the front end of the piercing tool come into contact with each other.

(6) The eyeglass lens processing apparatus according to (1), further comprising a periphery processing unit including a periphery processing tool for grinding or cutting the periphery of the lens, wherein the control unit sequentially operates the periphery processing unit and the piercing unit with respect to the lens, operates the detecting unit before or after piercing, and inhibits the operation of the periphery processing unit and the piercing unit when it is detected that the piercing tool is broken.

DETAILED DESCRIPTION OF PREFERRED EMBODIMENTS

Figure 1:
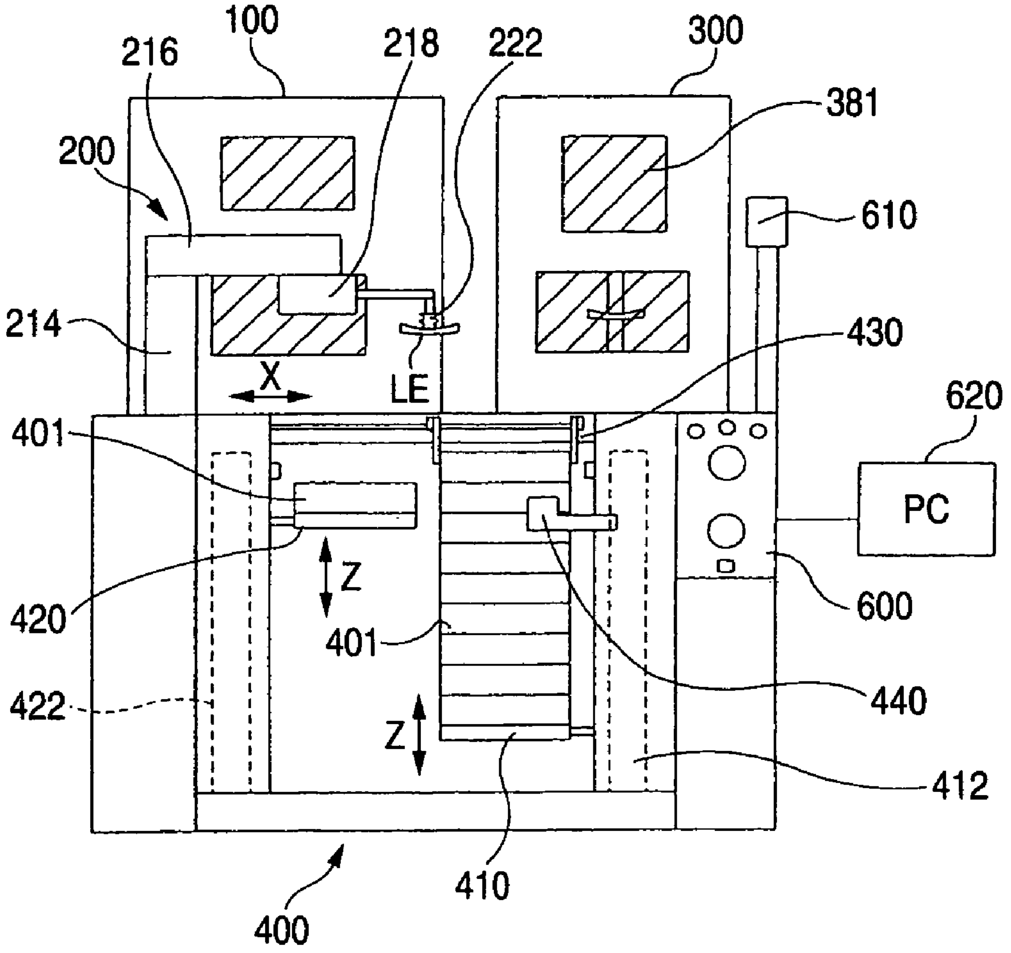
FIG. 1 illustrates a schematic configuration of an eyeglass lens processing system according to an embodiment of the present invention.

Hereinafter, an embodiment of the present invention will be described according to the accompanying drawings. FIG. 1 illustrates a schematic configuration of an eyeglass lens processing system according to an embodiment of the present invention.

The eyeglass lens processing system 1 includes a periphery processing device 100 for grinding or cutting (grinding, in the present embodiment) the periphery of an eyeglass lens LE, a lens carrying device (robot hand device) 200 for carrying the lens LE, a piercing (drilling) device 300 for piercing (forming) a hole in the lens LE, a lens stock device 400 which stocks lens trays 401 for receiving plural pairs of left and right lenses LE, and a system control unit 600 for controlling each device. The system control unit 600 is connected to a host computer (host PC) 620 for managing order data. An alarm lamp 610 connected to the system control unit 600 notifies that an abnormal state is generated in each device, such as the break of a piercing (drilling) tool.

The stock device 400 includes a delivering stage 410 and a receiving stage 420, in which trays 401 are arranged in vertical direction (Z direction), a movement unit 412 for moving the stage 410 in the vertical direction, a movement unit 422 for moving the stage 420 in the vertical direction, a clamp arm unit 430 for holding and moving the tray 401 from the stage 410 to the stage 420, and a barcode reader 440 for reading a barcode of an operation number affixed to the tray 410. Since ten trays 401 can be mounted in the stages 410 and 420, a ten set of lenses LE can be successively processed.

The periphery processing device 100 and the piercing device 300 are mounted on a table 20 of the system 1. The carrying device 200 is provided to be moved in the horizontal direction (X direction) along a carrying path in the periphery processing device 100, the piercing device 300, and the stock device 400. The carrying device 200 is provided with a vertical slide unit 214 which can move in the vertical direction, the vertical slide unit 214 is provided with a first arm portion 216 which can rotate in a horizontal direction, and the first arm portion 216 is provided with a second arm portion 218 which can rotate in the horizontal direction. In addition, the front end of the second arm portion 218 is provided with an attachment portion 222 for attaching and holding the lens LE. The attachment portion 222 is connected to an air pump and attaches and holds the lens LE by driving the air pump. The carrying device 200 extracts the non-processed lens LE from the tray 401, sequentially carries the non-processed lens LE into the periphery processing device 100 and the piercing device 300, and returning the processed lens LE back to the same tray 401.

Figure 2:
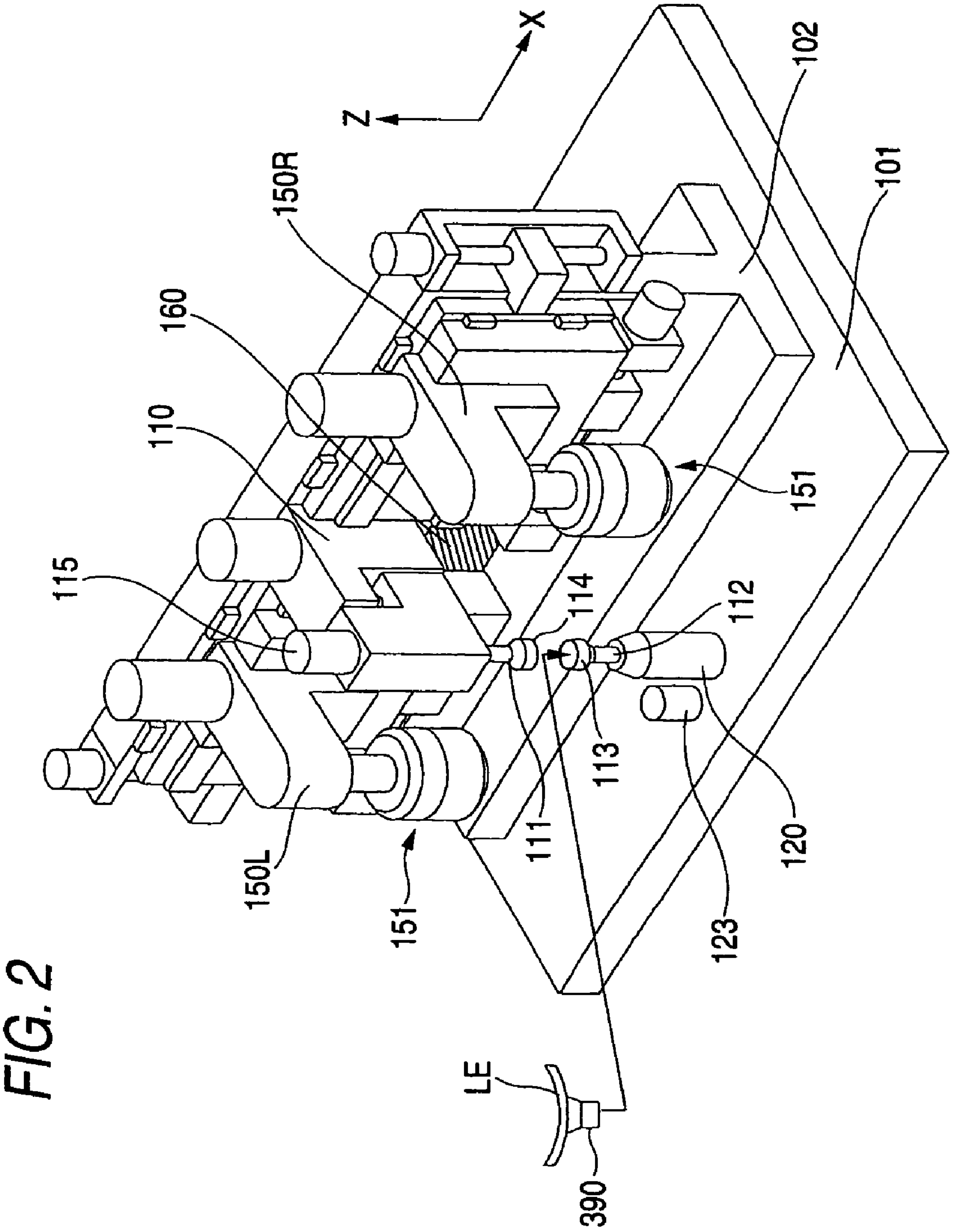
FIG. 2 illustrates a schematic configuration of a periphery processing device.

FIG. 2 illustrates a schematic configuration of the periphery processing device 100. The lens LE is held by chuck shafts 111 and 112 which extend in the vertical direction (Z direction). The upper chuck shaft 111 moves in the vertical direction by a movement tool unit 110, which is provided at the center of a sub-base 102 erected on a main base 101, and rotates by a motor 115. The lower chuck shaft 112 is rotatably held by a holder 120 fixed to the main base 101 and rotates by a motor 123 in synchronization with the chuck shaft 111.

When holding the lens LE by the chuck shafts 111 and 112, a cup 390, which is a process jig, is attached to the lens LE by an adhesive band. A cup holder 113 for inserting a base portion of the cup 390 is attached on the upper end of the chuck shaft 112. Furthermore, a lens pressing member 114 is attached on the lower end of the chuck shaft 111.

The lens LE held by the chuck shafts 111 and 112 is grinded from two directions by periphery processing units 150R and 150L in which grindstones 150 are attached to their rotation shafts, respectively. The grindstone includes a rough grindstone, a flat finishing grindstone, a bevel finishing (beveling) grindstone, and a chamfering grindstone. The periphery processing units 150R and 150L are bilaterally symmetrical and move by the movement tool units provided at the sub-base 102, in the vertical direction (Z direction) and the horizontal direction (X direction). In addition, the configuration of the periphery processing device 100 is basically similar to that of the device disclosed in U.S. Pat. No. 5,716,256 (Japanese Unexamined Patent Application Publication No. 9-2593999)).

Figure 3:
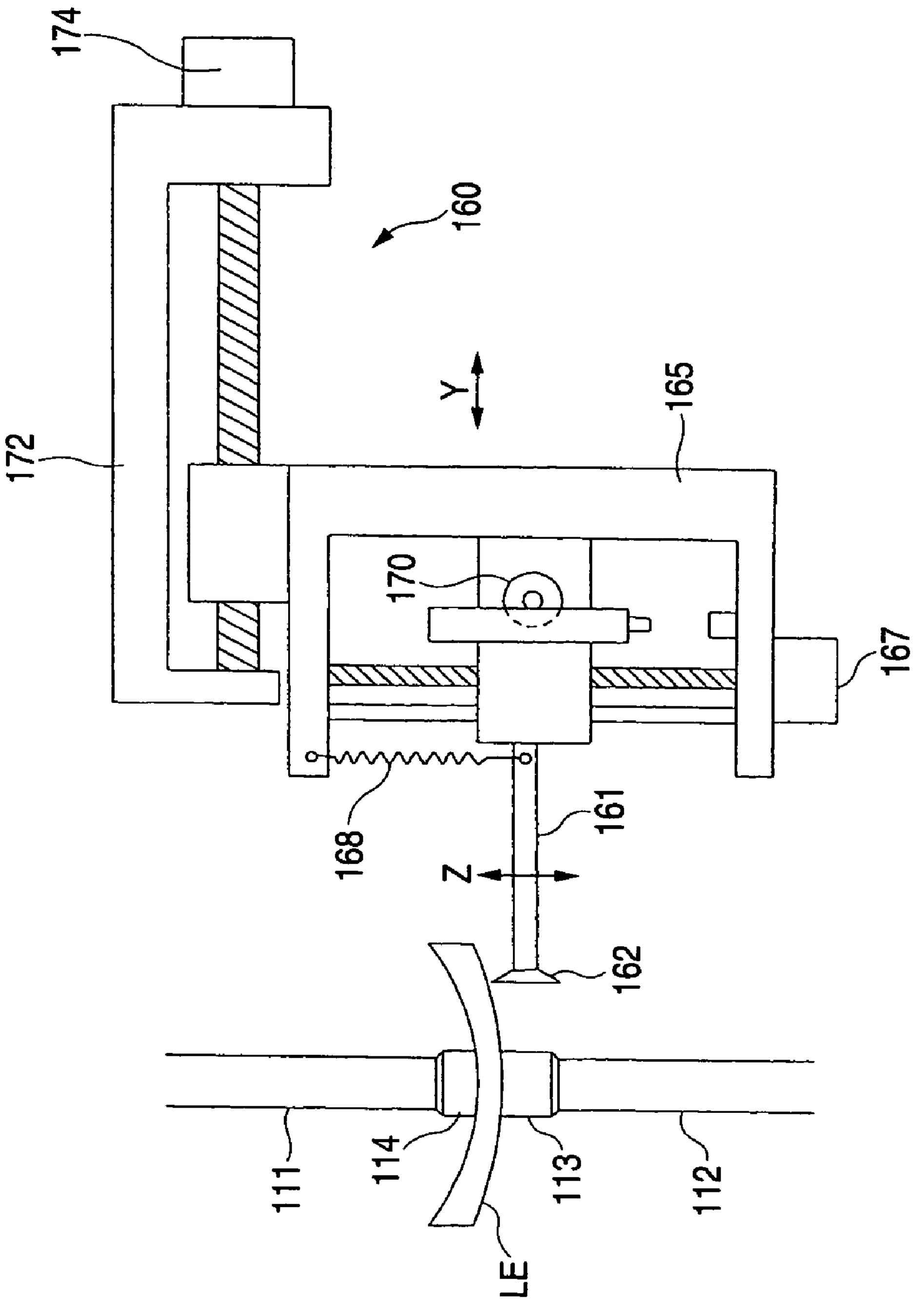
FIG. 3 illustrates a schematic configuration of a lens shape measuring unit.

FIG. 3 illustrates a schematic configuration of a lens shape measuring unit 160. The lens shape measuring unit 160 is received at the center of the sub-base 102 (see FIG. 2). The lens shape measuring unit 160 includes a feeler (contactor) 162 which is attached to the front end of a measuring arm 161 and contacts a front refractive surface of the lens LE, a movement support base 165 for holding the measuring arm 161 to be moved in the vertical direction (Z direction), a motor 167 for moving the measuring arm 161 in the vertical direction, a spring 168 for always biasing the measuring arm 161 in the vertical direction, a detector 170 for detecting the position of the measuring arm 161 in the vertical direction, such as a potentiometer, a support base 172 for holding the movement support base 165 to be moved in cross direction (Y direction), and a motor 174 for moving the movement support base 165 in the cross direction.

When measuring the shape of the front refractive surface of the lens LE, based on radius information of a target lens shape (traced outline shape), the lens LE rotates by the motor 115 and 123 and the feeler 162 (the measuring arm 161 and the movement support base 165) moves by the motors 167 and 174. Since the feeler 162 comes into contact with the front refractive surface of the lens LE by the spring 168, the position of the feeler 162 in the vertical direction is detected by the detector 170. In addition, the lens LE rotates once while bringing the feeler 162 into contact with the front refractive surface of the lens LE, and the feeler 162 moves in the cross direction based on the radius information of the target lens shape. At this time, the position of the feeler 162 in the vertical direction is detected by the detector 170. At the time of piercing, the feeler 162 is positioned at a specific hole position and the position thereof in the vertical direction is detected by the detector 170. When the inclination angle of the front refractive surface of the lens LE is required, an approximate inclination angle is obtained by positioning the feeler 162 at two positions of the specific hole position and a position which is externally spaced apart from the specific hole position by a predetermined distance (for example, 0.5 mm) and detecting the positions thereof in the vertical direction by the detector 170.

Incidentally, the lens shape measuring unit 160 includes a feeler for measuring the shape of a rear refractive surface of the lens LE. However, the feeler for the rear refractive surface of the lens LE is basically opposite to the feeler for measuring the shape of the front refractive surface of the lens LE and thus their description will be omitted.

Figure 4:
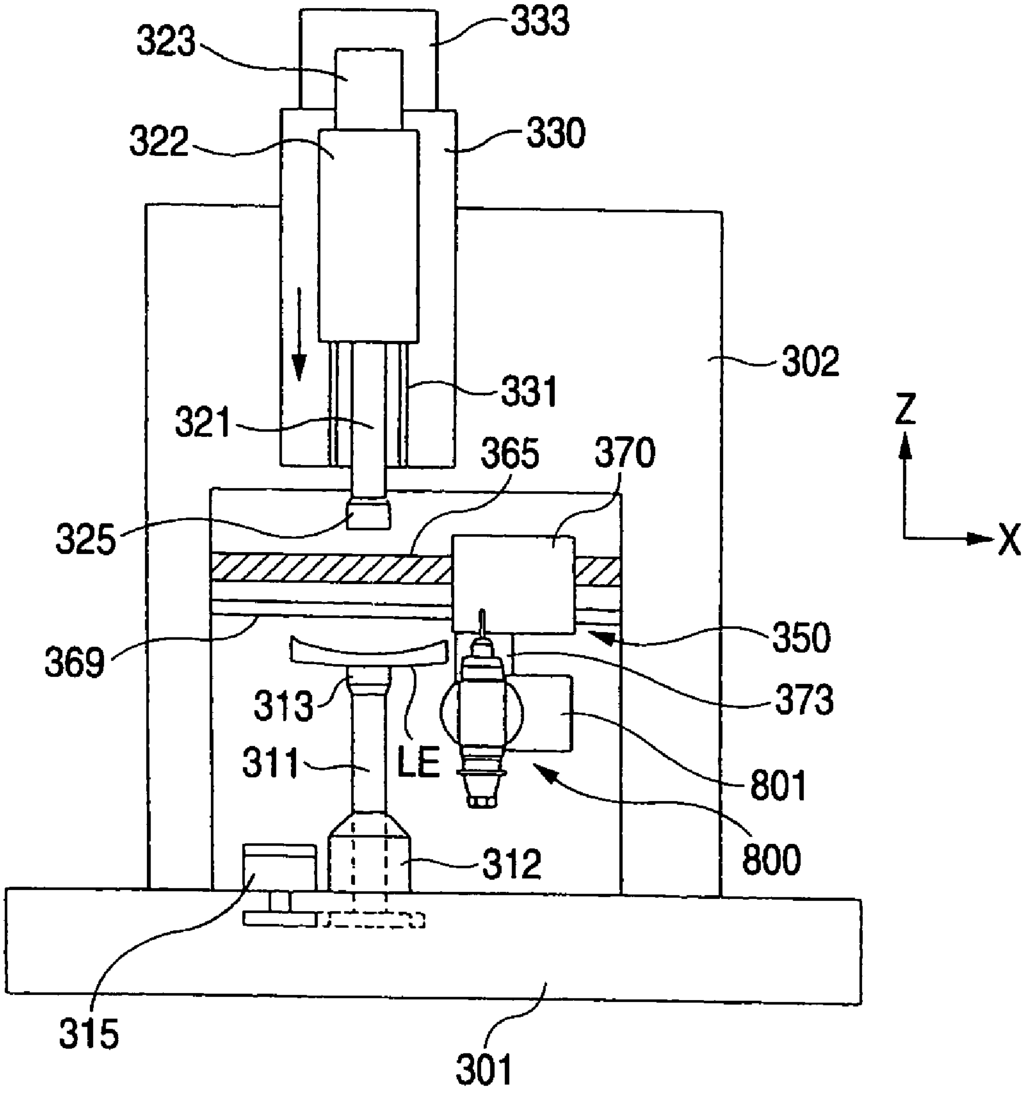
FIG. 4 illustrates a schematic configuration of a lens holding unit in a piercing device.

Next, the configuration of the piercing device 300 will be described with reference to FIGS. 4 through 8. FIG. 4 illustrates a schematic configuration of a lens holding unit in the piercing device 300, when viewing the inside of the device 300 at the front side thereof. The lens LE is held by chuck shafts 311 and 321 which extend in the vertical direction (Z direction). The upper chuck shaft 321 is rotatably held by the holder 322 and rotate by a motor 323 provided on the holder 322. In addition, a block 330 is fixed at the upper side of the sub-base 302 erected on the base 301, and the holder 322 is attached at the front side of the block 330 to be moved along a slide rail 331 in the vertical direction. The holder 322 moves in the vertical direction by a motor 333 provided on the block 330. Accordingly, the chuck shaft 321 moves in the vertical direction. The lower chuck shaft 311 is rotatably held by a holder 312 fixed to the base 301 and rotates by a motor 315 in synchronization with the chuck shaft 321.

A cup holder 313 for inserting a base portion of the cup 390 fixed to the lens LE is attached on the upper end of the chuck shaft 311. A lens pressing member 325 is attached on the lower end of the chuck shaft 321.

Figure 5:
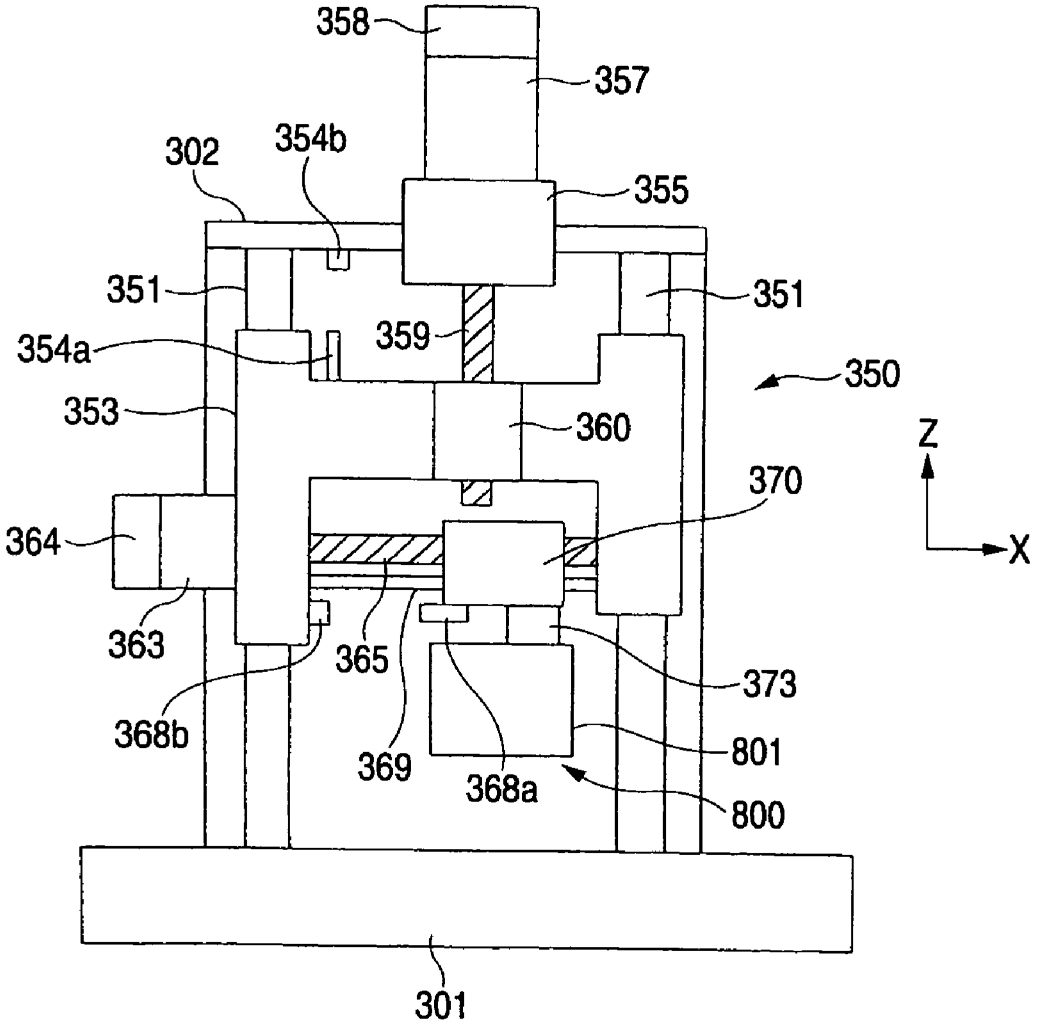
FIG. 5 illustrates schematic configurations of vertical and horizontal movement units in the piercing device.

A piercing (drilling) unit 800 is moved by a movement tool unit 350 in the vertical direction (Z direction) and the horizontal direction (x direction). FIG. 5 illustrates schematic configurations of vertical and horizontal movement units in the piercing device 300, when viewing in the inside of the device 300 at the rear side thereof. Two shafts 351, which extend in the vertical direction, are erected on the main base 301, and a movement support base 353 is provided to be moved along the shafts 351 in the vertical direction. A block 355 is fixed at the upper side of the sub-base 302, and the rotation shaft of a motor 357 provided on the block 355 is connected with a feed screw 359 which extends in the vertical direction. A nut block 360 is fixed to the rear surface of the movement support base 353, the movement support base 353 moves together with the nut block 360 in the vertical direction by rotating the feed screw 359.

The motor 357 is provided with an encoder 358, and the position of the movement support base 353 in the vertical direction, that is, the position of the piercing unit 800 in the vertical direction, is detected by the encoder 358. An original point position of the piercing unit 800 in the vertical direction is detected by a light shielding plate **354*a* fixed to the movement support base 353 and a photo sensor 354*b* fixed to the sub-base 302**.

The rotation shaft of the motor 363 fixed to the movement support base 353 is connected with a feed screw 365 which extends in the horizontal direction. When the feed screw 365 rotates, a movement block 370 formed with a feed nut is guided in the horizontal direction by the shaft 369 which extends in the horizontal direction. The piercing unit 800 is attached to the movement block 370 through an attachment plate 373. Thus, the piercing unit 800 moves in the vertical direction by the forward/reverse rotation of the motor 357 and moves in the horizontal direction by the forward/reverse rotation of the motor 363.

The motor 363 is provided with an encoder 364, and the position of the movement block 370 in the horizontal direction, that is, the position of the piercing unit 800 in the horizontal direction, is detected by the encoder 364. An original point position of the piercing unit 800 in the horizontal direction is detected by a light shielding plate **368*a* fixed to the movement block 370 and a photo sensor 368*b* fixed to the movement support base 353**.

Figure 6:
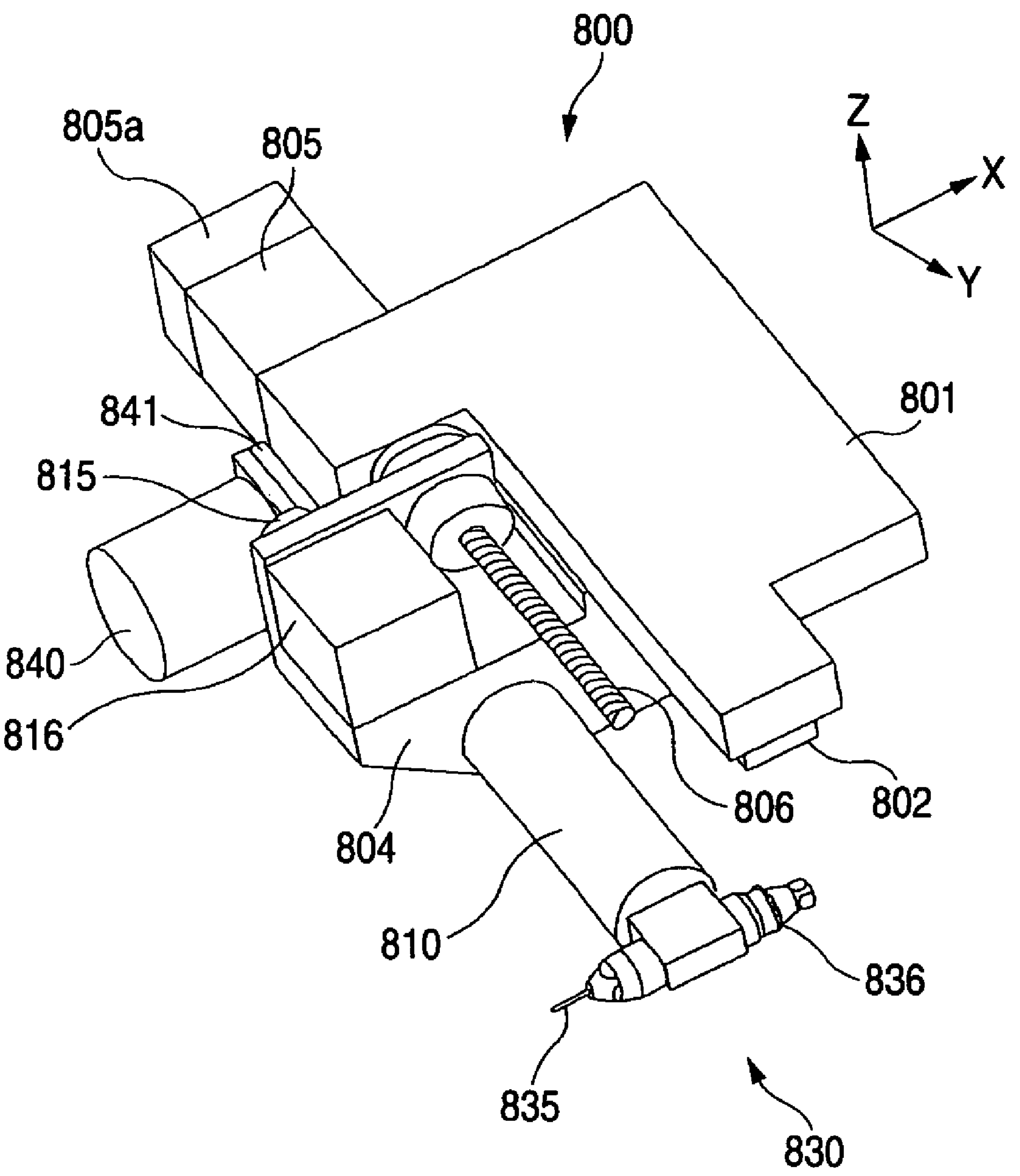
FIG. 6 illustrates a schematic configuration of a piercing unit.
Figure 7:
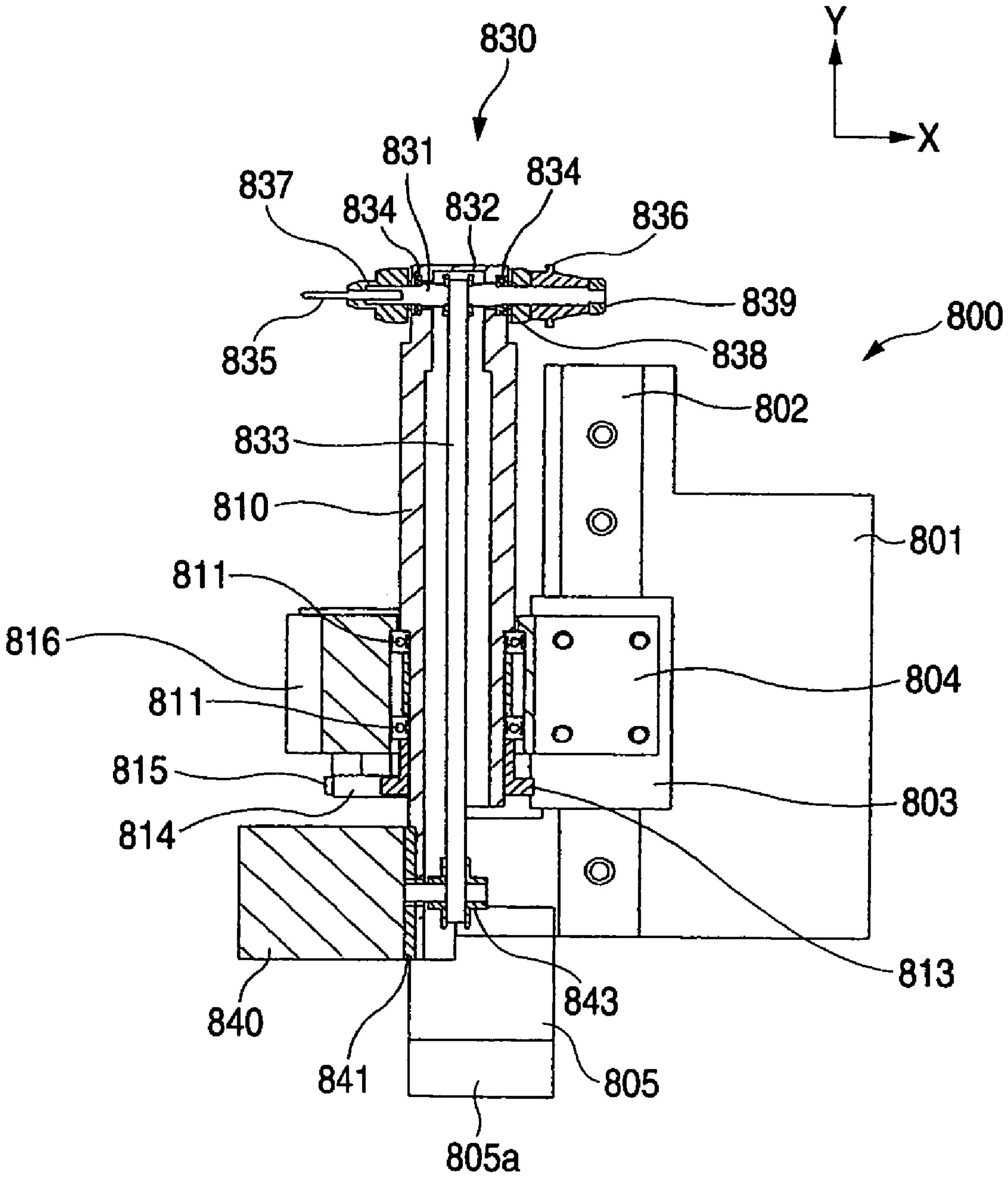
FIG. 7 is a cross-sectional view illustrating the schematic configuration of the piercing unit.

FIG. 6 illustrates a schematic configuration of the piercing unit 800, and FIG. 7 is a cross-sectional view illustrating the schematic configuration of the piercing unit 800.

The attachment plate 373 of the movement unit 350 is fixed with a fixed plate 801 which becomes the base of the piercing unit 800. The fixed plate 801 is attached with a rail 802 which extends in the cross direction (Y direction), and a slider 803 is slidably provided on the rail 802. The slider 803 is fixed with a movement support base 804, and a motor 805 fixed to the fixed plate 801 rotates a ball screw 806 such that the movement support base 804 moves in the cross direction. The motor 805 is provided with an encoder **805*a*, and the position of the movement support base 804 in the cross direction, that is, the position of the piercing unit 800 in the cross direction, is detected by the encoder 805*a*. In addition, an original point position of the movement support base 804** in the cross direction is detected by a light shielding plate and a photo sensor (not shown).

A rotation support base 810 is pivotably supported to the movement support base 804 by a shaft bearing 811. Furthermore, at one side of the shaft bearing 811, a gear 813 is fixed to the rotation support base 810. The gear 813 is connected to a gear 815 attached to the rotation shaft of a pulse motor 816 fixed to the movement support base 804 through an idle gear 814. In other words, the rotation support base 810 rotates about the shaft of the shaft bearing 811 by rotating the motor 816. The rotation angle of the rotation unit 830 is managed by a pulse number output from the pulse motor 816.

A rotation unit 830 for holding a piercing (drilling)/grooving tool is provided on the front end of the rotation support base 810. The rotation unit 830 moves by the motor 805 in the cross direction. A pulley 832 is attached at the center of the rotation shaft 831 of the rotation unit 830, and the rotation shaft 831 is pivotably supported by two shaft bearings 834. Furthermore, one end of the rotation shaft 831 is attached with an end mill 835, which is the piercing tool, by a chuck portion 837, and the other end thereof is attached with a spacer 838 and a grooving cutter 836, which is the grooving tool, by a nut 839. In addition, the diameter of the end mill 835 is about 0.8 mm.

A motor 840 for rotating the rotation shaft 831 is fixed to an attachment plate 841 attached to the rotation support base 810. The rotation shaft of the motor 840 is attached to a pulley 843. A belt 833 is stretched over the pulley 832 and the pulley 843 in the rotation support base 810 such that the rotation of the motor 840 is delivered to the rotation shaft 831.

Figure 8:
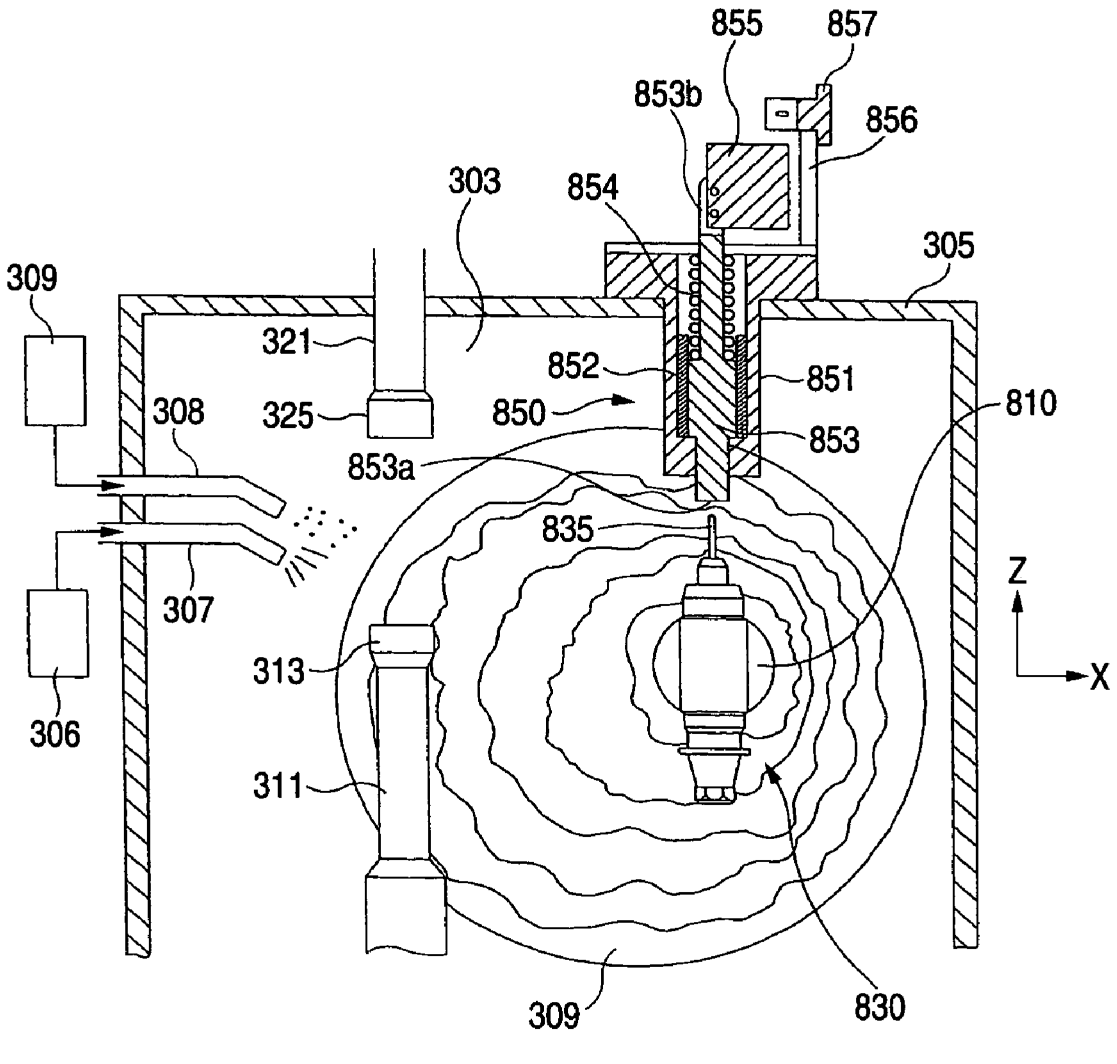
FIG. 8 illustrates a schematic configuration of a front-end position detecting unit of an end mill.

FIG. 8 illustrates a schematic configuration of a front-end position detecting unit 850 of the end mill 835. The detecting unit 850 can detect the break of the end mill 835. A shaft 853 is held in a support base 851 of the detecting unit 850 through a sliding shaft bearing 852 to be moved in the vertical direction (Z direction). The lower surface **853*a* of the shaft 853 is protruded from the support base 851 downward and becomes a contactor which comes into contact with the end mill 835. The shaft 853 is always biased downward by a spring 854. An upper side 853*b* protruded from the upper side of the support base 851 upward is fixed with a light shielding plate 855. In addition, the upper side of the support base 851 is fixed with a photo sensor 857 through an attachment plate 856. The photo sensor 857 is positioned at a position for detecting the light shielding plate 855, by pushing the shaft 853** upward by at least a predetermined distance.

In a case where the end mill 835 is not broken, when the rotation unit 830 positioned at an initial position moves upward by a predetermined distance, the front end of the end mill 835 comes into contact with the lower surface **853*a* of the shaft 853 to push the shaft 853 upward. The light shielding plate 855 also moves upward by moving the shaft 853 upward and is detected by the photo sensor 857. Then, the encoder 358 detects the position of the rotation unit 830 in the vertical direction when the photo sensor 857 detects the light shielding plate 855 such that the position of the front end of the end mill 835 is detected. In addition, in a case where the end mill 835 is broken, although the rotation unit 830 moves upward by the predetermined distance, the front end of the end mill 835 does not contact the lower surface 853*a* of the shaft 853 and thus the photo sensor 857 cannot detect the light shielding plate 855. Accordingly, it is possible to detect the break of the end mill 835**.

In addition, the support base 851 is provided at the upper side of a partition 305 for forming a process chamber 303 of the piercing device 300. The lower surface **853*a* of the shaft 853 is disposed in the process chamber 303, but the light shielding plate 855 and the photo sensor 857 which is an electrical element are disposed at the outside of the process chamber 303. In the process chamber 303, at the time of piercing the lens LE, air supplied from an air pump 306 is ejected from a nozzle 307 such that cut scrap (process waste) attached to the lens LE is blown off. Furthermore, at the time of grooving the lens LE or after piercing the lens LE, water supplied from a water (cleaning liquid) supply unit 309 is ejected from a nozzle 308. Accordingly, the cut scrap or water flies in the process chamber 303. Since the photo sensor 857, which is the electrical element, need be protected from the cut scrap or the water, the photo sensor 857 is disposed at the outside of the process chamber 303. Furthermore, a portion of the front side of the rotation support base 810 and the rotation unit 830 are disposed in the process chamber 303, but the rear side of the rotation support base 810 is covered by a diaphragm 309 having an extensible accordion structure. Accordingly, the movement unit of the piercing unit 800 is far apart from the process chamber 303** to be protected from the cut scrap or the water.

Figure 9:
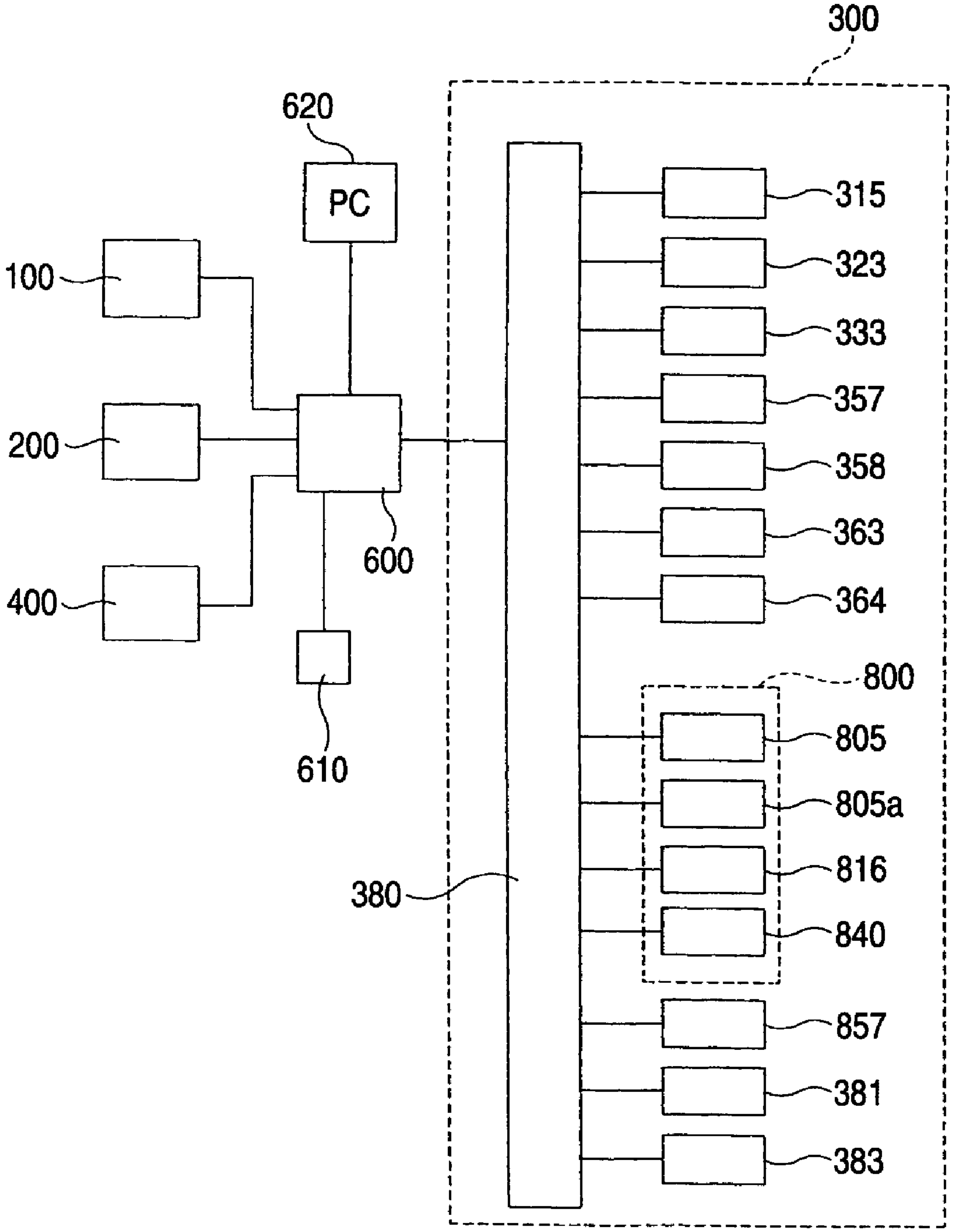
FIG. 9 is a schematic block diagram of a control system of an eyeglass lens processing system.

Next, an operation of the eyeglass lens processing system having the above-mentioned configuration will be described using a schematic block diagram of a control system illustrated in FIG. 9.

First, when the end mill 835 is replaced with a new end mill due to the lift span or the damage thereof, a maintenance screen is displayed by manipulating a specific key on a touch panel display 381 and a piercing tool replacement mode is then set. When the piercing tool replacement mode is set, a control unit 380 controls the respective motors of the movement unit 350 and the piercing unit 800 and positions the rotation unit 830 at a predetermined replacement position. An operator replaces the end mill 835 attached by the chuck portion 837 with a new end mill 835 and then presses a reset switch of the display 381 to input an initializing signal to the device. When the initializing signal is input, the control unit 380 controls the respective motors of the movement unit 350 and the piercing unit 800 and positions the rotation unit 830 lower than the lower surface 853*a* of the shaft 853 such that the shaft of the end mill 835 extends in parallel to the vertical direction (Y direction), that is, in vertical. Thereafter, the motor 357 is controlled such that the end mill 835 moves upward together with the rotation unit 830. By this movement, the front end of the end mill 835 comes into contact with the lower surface 853*a* of the shaft 853 and the shaft 853 is pushed upward. Thus, the photo sensor 857 detects the light shielding plate 855.

The control unit 380 reads the position of the rotation unit 830 in the vertical direction when the detected signal of the photo sensor 857 is obtained, from the output of the encoder 358, and obtains the front-end position of the end mill 835. A memory 383 stores the front-end position data of the end mill 835 before the replacement, and the control unit 380 corrects (updates) the front-end position data having already been stored in the memory 383 to new front-end position data. The front-end position data is managed as a difference from a predetermined reference position (including a method which manages the front-end position data as a difference from previous front-end position data). The control unit 380 uses the front-end position data which is newly stored in the memory 383 as a hole depth adjustment value for piercing.

Next, the processing of the periphery of the lens LE and the piercing of the lens LE will be described. The operator receives a pair of non-processed lenses LE in a tray 401 and mounts ten trays 401 on the stage 410 of the stock device 400 in the vertical direction, as process preparation. The lens LE received in the tray 401 is previously fixed with the cup 390. The operator presses a process switch of the system control unit 600 to operate the processing system.

First, the stock device 400 operates and the operation number affixed to an uppermost tray 401 is read by the reader 440. The system control unit 600 reads target lens shape data corresponding to the operation number and data related to the piercing (hole position data, hole diameter data, hole direction data, hole depth data, or the like) from the host PC 620 and transmits the data necessary for each process to the periphery processing device 100 and the piercing device 300. When the uppermost tray 401 of the stock device 400 is positioned at a predetermined delivery position, the carrying device 200 holds the lens LE by the attachment portion 222 and carries the lens LE to the periphery processing device 100.

In the periphery processing device 100, the lens LE is held by the chuck shafts 111 and 112, and the shapes of the front refractive surface and the rear refractive surface of the lens LE is measured based on the target lens shape data by operating the lens shape measuring unit 160. These measured data are used for processing the periphery of the lens LE. If the piercing exists in an operation instruction, two positions of a specific hole position and a position which is externally spaced apart from the specific hole position in the X direction by a predetermined distance (for example, 0.5 mm) are measured based on the hole position data (for example, the XY-coordinate position from the center of the target lens shape) and the positions in the Z direction thereof are obtained. When the measurement is finished, the measured data are transmitted (input) from the control unit of the periphery processing device 100 to the control unit 380 of the piercing device 300.

When the measurement data of the shape of the lens LE is obtained, the periphery of the lens LE is grinded by the periphery grinding units 150R and 150L. In addition, when the periphery processing is finished, the lens LE is extracted from the periphery processing device 100 by the carrying device 200 and carried into the piercing device 300. In the piercing device 300, when the lens LE is mounted on the chuck shaft 31, the motor 333 is driven by the control of the control unit 380 and the chuck shaft 321 moves downward and holds the lens LE.

Figure 10:
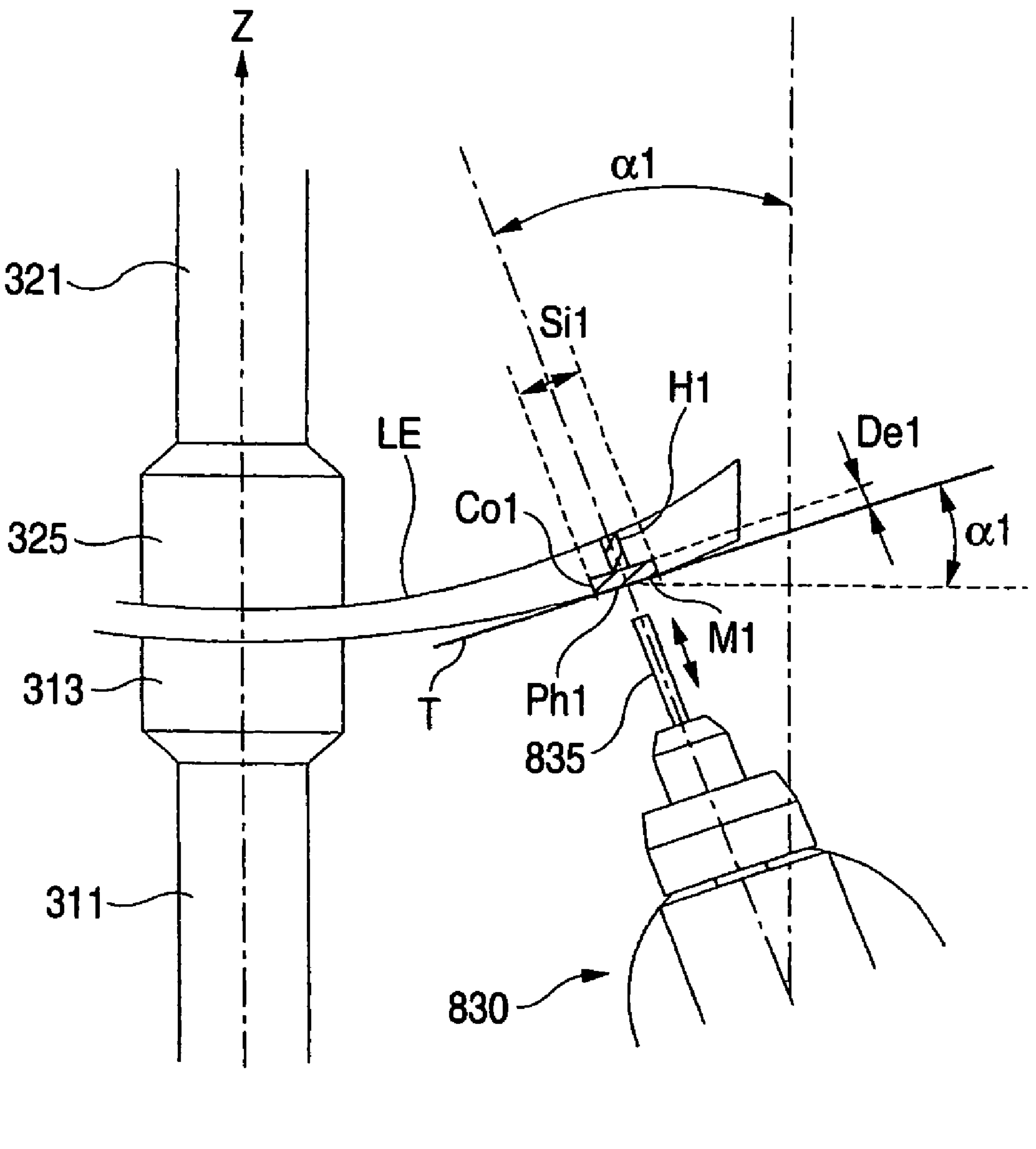
FIG. 10 illustrates an example of a process of forming a spot-facing hole in an eyeglass lens.

The piercing will be described. The piercing data (processing data) is determined by the control unit 380, based on the data related to the piercing (hole position data, hole diameter data, hole direction data, hole depth data, or the like) input from the host PC 620 and the shape data of the front refractive surface of the lens LE obtained by the lens shape measuring unit 160 of the periphery processing device 100. For example, as illustrated in FIG. 10, suppose that a spot-facing hole Co1 having a depth De1 and a diameter Si1 is formed centered on a hole position Ph1 of a through hole H1. Suppose that the hole directions of the spot-facing hole Co1 and the through hole H1 are specified in a normal direction of the front refractive surface of the lens LE. The Z-direction position data of the position Ph1 and the Z-direction position data of a position M1 which is externally spaced apart from the position Ph1 by a predetermined distance are input from the periphery processing device 100. The control unit 380 obtains a tangent T of the front refractive surface of the lens LE at the position Ph1 and the inclination angle thereof α1, based on each position data of the position Ph1 and the position M1 in Z direction. Since the depth De1 is perpendicular to the tangent T, the control unit 380 obtains the piercing data by set the inclination angle with the shaft of the end mill 835 to α1 and moving the front end of the end mill 835 by the diameter Si1 and the depth De1 in a direction perpendicular to the tangent T.

When the piercing data is obtained, the control unit 380 controls the motors 315 and 323 to rotate the lens LE, and then controls the respective motors of the piercing unit 800 to incline the end mill 835 with respect to the Z-axis by the angle α1, as illustrated in FIG. 10. In this state, while rotating the end mill 835, the motors 357, 363, and 805 are controlled based on the piercing data such as the diameter Si1 and the diameter De1 centered on the position Ph1 to move the front end of the end mill 835 such that the spot-facing hole Co1 can be precisely formed. At this time, the control unit 803 can control the front-end position of the end mill 835 based on the front-end position data stored in the memory 383 to form the spot-facing hole having the depth De. In addition, a through hole H1 may be formed by moving the front end of the end mill 835 positioned at the position Ph1 in a direction having the angle α1 with the Z-axis.

At the time of the piercing, air is ejected from the nozzle 307 and the cut scrap attached to the hole of the lens LE and the end mill 835 is blown off. In addition, after the piercing, the water is ejected from the nozzle 308 to clean the lens LE.

When the piercing is finished, the lens LE is extracted from the piercing device 300 by the carrying device 200 and returns to an original position of the same (original) tray 401. Subsequently, the other lens LE received in the same tray 401 is similarly carried and subjected to the periphery processing using the periphery processing device 100 and the piercing using the piercing device 300. When the process of the pair of lenses LE received in the tray 401 is finished, the tray 401 in which the processed lenses are received moves to the stage 420 by the clamp arm unit 430 and is mounted on the stage 420. Subsequently, in order to process the lens LE received in the next tray 401, a second tray 401 moves to a specific delivery position and the lens LE received in the tray 401 is carried into the periphery processing device 100 and the piercing device 300 by the carrying device 200 and is then subjected to the same process.

In addition, since the end mill 835 is thin as a diameter of 0.8 mm, the end mill 835 may be broken during processing a plurality of lenses LE. Since the end mill 835 has a uniform diameter from the root to the front end thereof, the end mill 835 is broken at the root in the structure. In order to detect whether the end mill 835 is broken by the detecting unit 850 before performing the piercing, the control unit 380 disposes the end mill 835 at an initial position below the lower surface 853*a* of the shaft 853 and moves the end mill upward by a predetermined distance by driving the motor 357. When the end mill 835 is broken at the just previous process, although the end mill 835 moves upward by the predetermined distance, the shaft 853 cannot be pushed upward and thus the photo sensor 857 is not turned on. When it is detected that the end mill 835 is broken, the control unit 380 (inhibits) stops the process and displays an error message on the display 381. Furthermore, an error signal indicating that the end mill 835 is broken is transmitted to the system control unit 600. The system control unit 600 turns on the alarm lamp 610 to notify the operator of the abnormal state of the system and inhibits (stops) the operation of the periphery processing device 100 and the carrying device 200. The operator can recognize that the end mill 835 is broken by the ON state of the alarm lamp 610 and the error message of the display 381 and replace the end mill 835 with a new end mill. Accordingly, it is possible to suppress lens processing failure from being generated in large quantities due to the break of the end mill 835. Alternatively, the operation of the detecting unit may be performed after the piercing, not before the piercing.

The above-mentioned embodiment may be variously modified. For example, although, in the detecting unit 850 illustrated in FIG. 8, the end mill 835 moves upward by the movement tool unit 350 and the shaft 853 is pushed upward, the relative movement may be opposite thereto. In other words, by a tool for moving the detecting unit 850 to a position which contacts the front end of the end mill 835, the sensor 857 may be turned on when the end mill 835 is not broken.

Although, in the above-mentioned embodiment, the piercing unit 800 and the detecting unit 850 are provided independent of the periphery processing units 150R and 150L, the piercing unit 800 and the detecting unit 850 may be provided in the periphery processing device 100, as disclosed in U.S. Pat. No. 6,790,124 (Japanese Unexamined Patent Application Publication No. 2003-145328). Furthermore, the periphery processing unit may grind the lens LE at one direction, not at two directions. In addition, a belt conveyor may be used as a configuration for successively supplying the lens LE received in the tray 401.

Incidentally, the piercing tool is not limited to the end mil, and well-known drill and the like can also be employed as the piercing tool.

What is claimed is:

1. An eyeglass lens processing apparatus comprising:

a lens holding unit that holds and rotates an eyeglass lens;

a piercing tool for forming a hole in the lens, the hole including a non-through hole for attaching a rimless frame to be formed on a refractive surface of the lens;

an inclining unit that relatively inclines the piercing tool with respect to the lens held by the lens holding unit;

a movement unit that relatively moves the piercing tool in a direction of a rotating axis with respect to the lens held by the lens holding unit;

an axis-to-axis changing unit that two-dimensionally moves a hole forming position with respect to the lens by changing a distance between a rotating axis of the lens and the rotating axis of the piercing tool in combination with rotating the lens;

a first input unit that inputs target lens shape data of an eyeglass frame and layout data of the lens relative to the frame by communication or an input key;

a second input unit that inputs two-dimensional position data, direction data and depth data of the non-through holed by communication or an input key;

a detecting unit that includes a sensor for detecting a movement position of a shaft that is brought into contact with a front end of the piercing tool and detects a position of the front end of the piercing tool in the direction of the rotating axis;

a storing unit that stores position data of the front end of the piercing tool;

an operation unit that corrects the front-end position data stored in the storing unit in advance, based on an output of the detecting unit, and obtains hole forming data based on the corrected front-end position data and each input data input by the first and second input units; and a control unit that controls a process of forming the non-through hole based on the obtained hole forming data.

2. The eyeglass lens processing apparatus according to claim 1, further comprising a third input unit that inputs inclination angle data of the refractive surface at the hole forming position of the lens, wherein the operation unit obtains the hole forming data based on the corrected front-end position data and each input data input by the first, second and third input units.

3. The eyeglass lens processing apparatus according to claim 1, further comprising a periphery processing tool for grinding or cutting the periphery of the lens, wherein the control unit inhibits processing of the periphery and piercing when it is detected that the piercing tool is broken.

4. The eyeglass lens processing apparatus according to claim 1 further comprising a lens shape input unit that obtains shape data of the refractive surface of the lens by bringing a contactor into contact with the refractive surface or obtains stored shape data of the refractive surface, wherein the operation unit obtains the hole forming data based on the corrected front-end position data and each input data input by first and second input units and the lens shape input unit.

5. An eyeglass lens processing apparatus comprising:

a lens holding unit that holds and rotates an eyeglass lens;

a piercing tool for forming a hole in the lens, the hole including a non-through hole for attaching a rimless frame to be formed on a refractive surface of the lens;

an inclining unit that relatively inclines the piercing tool with respect to the lens held by the lens holding unit;

a movement unit that relatively moves the piercing tool in a direction of a rotating axis with respect to the lens held by the lens holding unit;

an axis-to-axis changing unit that two-dimensionally moves a hole forming position with respect to the lens by changing a distance between a rotating axis of the lens and the rotating axis of the piercing tool in combination with rotating the lens;

a first input unit that inputs target lens shape data of an eyeglass frame and layout data of the lens relative to the frame by communication or an input key;

a second input unit that inputs two-dimensional position data, direction data and depth data of the non-through hole by communication or an input key;

a detecting unit that includes a sensor for detecting a movement position of a shaft that is brought into contact with a front end of the piercing tool and detects a position of the front end of the piercing tool in the direction of the rotating axis;

a storing unit that stores a reference front-end position;

an operation unit that obtains a difference between the detected front-end position and the stored reference front-end position based on an output of the detecting unit and obtains hole forming data based on the obtained difference and each input data input by the first and second input units; and a control unit that controls a process of forming the non-through hole based on the obtained hole forming data.

6. The eyeglass lens processing apparatus according to claim 5, wherein the reference front-end position includes a front-end position detected previously.

7. The eyeglass lens processing apparatus according to claim 5 further comprising a third input unit that inputs an inclination angle data of the refractive surface at the hole forming position of the lens, wherein the operation unit obtains the hole forming data based on the obtained difference and each input data input by the first, second and third input units.

8. The eyeglass lens processing apparatus according to claim 5 further comprising a periphery processing tool for grinding or cutting the periphery of the lens, wherein the control unit inhibits processing of the periphery and piercing when it is detected that the piercing tool is broken.

9. The eyeglass lens processing apparatus according to claim 5 further comprising a lens shape input unit that obtains shape data of the refractive surface of the lens by bringing a contactor into contact with the refractive surface or obtains stored shape data of the refractive surface, wherein the operation unit obtains the hole forming data based on the obtained difference and each input data input by first and second input units and the lens shape input unit.

* * * * *